J. WHITESIDE.
Grain Separator Attachment.
No. 98,829.          Patented Jan. 11, 1870.
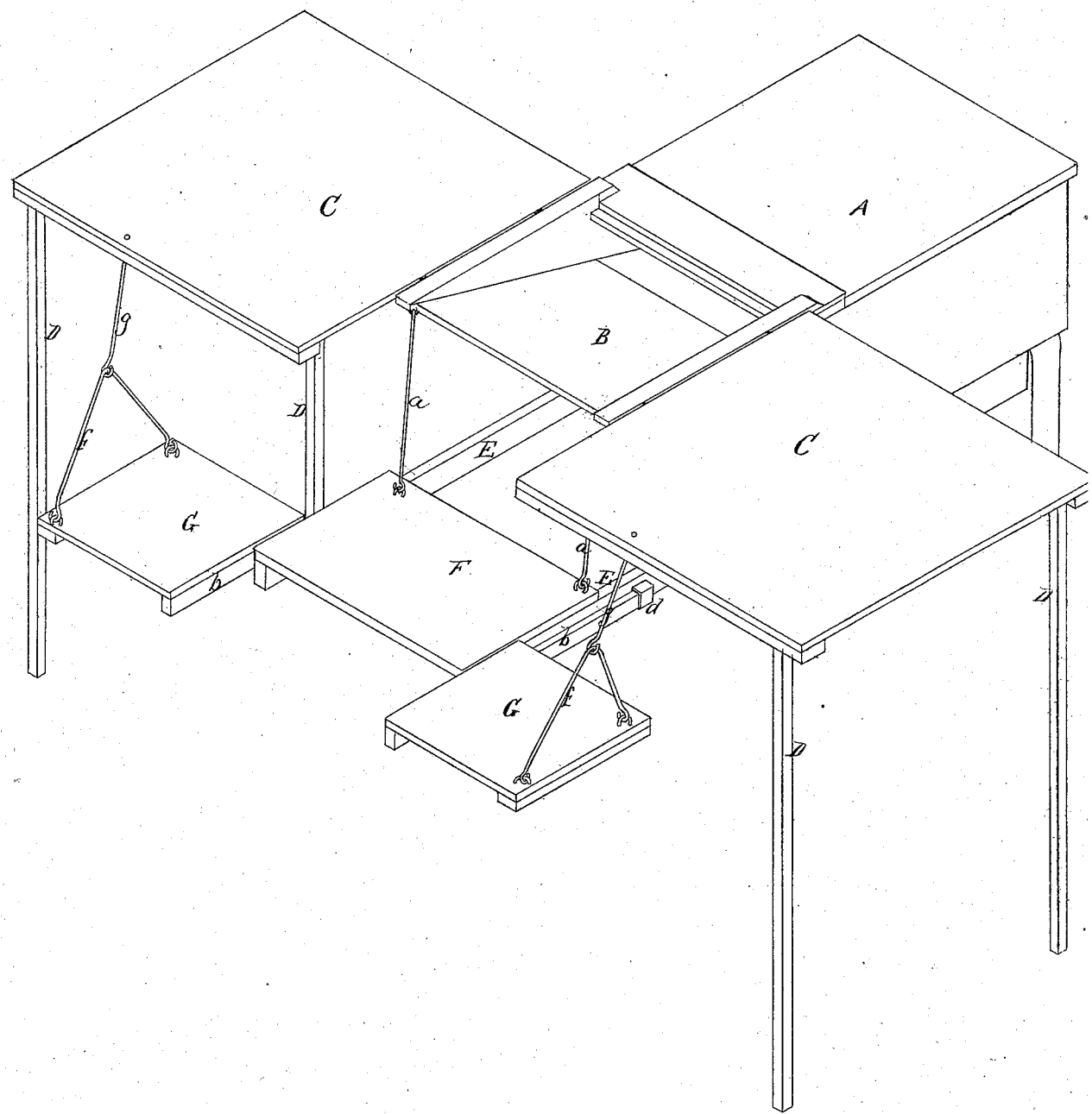

United States Patent Office.

JOHN WHITESIDE, OF SALINAS, CALIFORNIA.

IMPROVED PLATFORM ATTACHMENT FOR GRAIN-SEPARATORS.

Specification forming part of Letters Patent No. 98,829, dated January 11, 1870.

*To all whom it may concern:*

Be it known that I, JOHN WHITESIDE, of Salinas, county of Monterey, State of California, have invented an Improved Platform Attachment for Separators; and I do hereby declare the following description and accompanying drawings are sufficient to enable any person skilled in the art or science to which it most nearly appertains to make and use my said invention or improvements without further invention or experiment.

My invention relates to certain platforms to be attached to grain-separators for the convenience of the persons handling the grain; and it consists of two platforms, one secured on each side of the machine, and placed at such a distance from the ground with reference to the breast of the separator that the band-cutters can stand upon them, and thus be able to perform their work with greater ease.

In order to more fully illustrate and explain my invention, reference is had to the accompanying drawings, forming a part of this specification, in which—

A represents a separator of any of the known constructions, and C C the side platform or tables upon which the grain is thrown from the stack or wagon and the bands cut before being fed into the cylinder.

F is the platform upon which the person whose duty it is to feed the grain into the machine stands.

In the usual manner of attending to these machines boxes or trestles are used by the band-cutters or persons attending to the tables C to stand upon, which are very inconvenient, and in order to obviate the use of these boxes or trestles I attach platforms G G, one on each side of the feeder's platform F.

In order to attach these platforms to the machine, I secure an extended bar, $b$, along one side of the platform, one end of which fits in a socket, $d$, on the timbers E, upon which the platform F is secured, while they also rest in a socket near the ends of the timbers E, thus supporting them upon one side. The opposite sides are upheld by bent rods $f$ and connecting-rods $g$, which are attached to the tables C above, as shown.

These platforms can be readily detached from the machine when desired, and are far preferable to the boxes or trestles generally employed to perform the same duty, being much lighter and more easily handled, and when the machine is being moved from place to place they can be thrown upon it and moved with all ease.

By the use of these platform attachments great inconvenience and trouble are obviated, as it leaves the ground in front of the separator free and unobstructed, so that all loose grain may be taken away at any and all times, whether the separator be at work or not, without interfering in the least with the table-tenders, as is unavoidably the case when boxes or trestles are used.

The platforms can be attached or detached without loss of time and without unnecessary trouble.

Having thus described my invention, what I claim, and desire to secure by Letters Patent, is—

The detachable platforms G, supported by the bars $b$, at one side, upon the timbers E, and upheld at the opposite side by rods $f$ and $g$, or equivalent device, connected with the tables C above, substantially as and for the purpose described.

In witness whereof I have hereunto set my hand and seal.

JOHN WHITESIDE. [L. S.]

Witnesses:
    J. D. McDOUGALL,
    ELIAS HOWE.